US011227015B2

(12) United States Patent
Young et al.

(10) Patent No.: US 11,227,015 B2
(45) Date of Patent: Jan. 18, 2022

(54) SYSTEMS AND METHODS FOR ESTIMATING CARRIER TRANSIT TIMES

(71) Applicant: Target Brands, Inc., Minneapolis, MN (US)

(72) Inventors: Thomas Young, Minneapolis, MN (US); Adam Hollenbeck, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 51 days.

(21) Appl. No.: 16/890,848

(22) Filed: Jun. 2, 2020

(65) Prior Publication Data
US 2021/0374665 A1     Dec. 2, 2021

(51) Int. Cl.
*G06F 16/903* (2019.01)
*G06F 3/0482* (2013.01)
*G06Q 10/08* (2012.01)
*G06F 16/901* (2019.01)
*G06Q 30/06* (2012.01)

(52) U.S. Cl.
CPC ........ *G06F 16/9024* (2019.01); *G06F 3/0482* (2013.01); *G06F 16/903* (2019.01); *G06Q 10/0833* (2013.01); *G06Q 10/0838* (2013.01); *G06Q 10/087* (2013.01); *G06Q 30/0627* (2013.01)

(58) Field of Classification Search
None
See application file for complete search history.

(56) References Cited

U.S. PATENT DOCUMENTS

| 5,953,707 | A | 9/1999 | Ying et al. |
| 7,801,753 | B2 | 9/2010 | Vemula et al. |
| 9,261,376 | B2 * | 2/2016 | Zheng ................ G01C 21/3484 |

(Continued)

FOREIGN PATENT DOCUMENTS

| WO | 2019161394 A1 | 8/2019 |
| WO | 2019161398 A1 | 8/2019 |

OTHER PUBLICATIONS

Anon., "Llamasoft and ALK Technologies Partner to Provide Industry Standard PC*Miler(R) for Strategic Supply Chain Modeling," Business Wire [New York] Aug. 27, 2013. (Year: 2013).*

(Continued)

*Primary Examiner* — Nicholas D Rosen
(74) *Attorney, Agent, or Firm* — Merchant & Gould P.C.

(57) ABSTRACT

A software system operates to track transit times for shipments between facility locations within a supply chain. Carrier service level agreements are used to generate estimated transit times between a plurality of origins and destinations. Transit times are stored as edges between ZIP code nodes in a graph database. Facility locations are associated with the ZIP code node corresponding to their location. A user interface can access the data from the graph database to easily present the data to a user. In some examples, the data is stored based on ZIP code of each location. The user interface allows for 3 digit ZIP codes to be assigned to various user-defined regions to more easily manage the data on a broader level. Estimated transit times can also be accessed through an application programming interface for use by transportation management systems such as lead time estimation systems and inventory planning systems.

19 Claims, 13 Drawing Sheets

(56) References Cited

U.S. PATENT DOCUMENTS

| | | | |
|---|---|---|---|
| 9,336,510 B2* | 5/2016 | Dearing | G06Q 10/04 |
| 9,928,287 B2* | 3/2018 | Shmueli | G06F 16/28 |
| 9,953,332 B2* | 4/2018 | Bateman | G06Q 10/0833 |
| 11,106,641 B2* | 8/2021 | Zizka | G06F 16/28 |
| 2007/0016363 A1 | 1/2007 | Huang et al. | |
| 2011/0208429 A1* | 8/2011 | Zheng | G01C 21/3484 |
| | | | 701/533 |
| 2014/0244687 A1* | 8/2014 | Shmueli | G06F 16/28 |
| | | | 707/780 |
| 2014/0374478 A1* | 12/2014 | Dearing | B07C 3/18 |
| | | | 235/385 |
| 2016/0203422 A1 | 7/2016 | Demarchi et al. | |
| 2017/0154347 A1* | 6/2017 | Bateman | G06Q 40/08 |
| 2019/0057119 A1* | 2/2019 | Zizka | G06F 16/9024 |
| 2020/0151659 A1* | 5/2020 | Mangalassery Gregory | G06F 16/29 |
| 2020/0151667 A1* | 5/2020 | Mangalassery Gregory | G06Q 10/08355 |
| 2020/0167724 A1* | 5/2020 | Klitenik | H04B 17/318 |
| 2021/0097893 A1* | 4/2021 | Klappert | G06Q 10/047 |

OTHER PUBLICATIONS

Anon., "End-to-End Routing & Scheduling Solution," Material Handling & Logistics, Endeavor Business Media, Jan. 9, 2017. (Year: 2017).*

* cited by examiner

SYSTEMS AND METHODS FOR ESTIMATING CARRIER TRANSIT TIMES

TECHNICAL FIELD

The present disclosure relates to supply chain management. More particularly, the present disclosure is directed to methods and systems for determining transit times and lead times, including third party transit times.

BACKGROUND

Accurate lead times are an important factor in supply chain management. In particular, accurately estimating the amount of time from receipt of a purchase order to receipt of the ordered product at a receiving node within a supply chain is essential to managing many aspects of an enterprise supply chain. For example, lead times are used in inventory planning, positioning, and purchasing. A key aspect of estimating lead times is determining an estimated transit time for items being shipped between nodes of a supply chain—either from a vendor to a retailer, or between nodes within a retailer's supply chain.

Existing methods of tracking estimated transit times utilize tables to record information. For supply chains with a multitude of locations and transit lanes to track, this is difficult to access desired information, arduous to update that information, and provides little granularity or insight into the variance in transit times that may occur on particular transit lanes.

SUMMARY

In general terms, the present disclosure relates to a system for managing lead times in a supply chain comprising: a processing device; and a memory device communicatively coupled to the processing device. The memory device stores: a graph database including a plurality of location nodes representing ZIP codes and a plurality of edges between pairs of the location nodes representing transit times between the ZIP codes; and instructions which, when executed by the processing device, cause the processing device to: receive, at a data fetcher, a request for an transit time, the request including an origin and a destination; query, with the data fetcher, the graph database for an origin ZIP code and a destination ZIP code; retrieve the estimated transit time for the origin ZIP code node and destination ZIP code node, the at least one transit time being associated with a shipping mode; and output the at least one transit time and shipping mode for the origin ZIP code and destination ZIP code.

At least one aspect of the present disclosure is directed to a method of managing lead times of a shipment between an origin and destination within a supply chain. The method comprises: receiving, at a computing system, a request for a transit time, the request including an origin and a destination of a shipment; querying a graph database for an origin ZIP code and a destination ZIP code, the graph database comprising nodes representing ZIP codes connected by edges representing transit times between the ZIP codes; retrieving at least one transit time and shipping mode for the origin ZIP code and destination ZIP code; and outputting the at least one transit time and shipping mode.

In another aspect, a computer implemented method of managing transit time information for a supply chain presents a user interface on a display of a computing device. The user interface comprises a menu bar and an information display area. The menu bar is configured to display options for a plurality of a functions that can be implemented using the user interface, the options comprising: an origin to destination search option; a ZIP code search option; a transit time information upload option; and a node relationship search option The information display area is configured to display options for querying a transit time database and tables of search results obtained from the transit time database, the transit time database comprising a graph database storing estimated transit times as edges between origin nodes and destination nodes.

DETAILED DESCRIPTION

Figure 1:
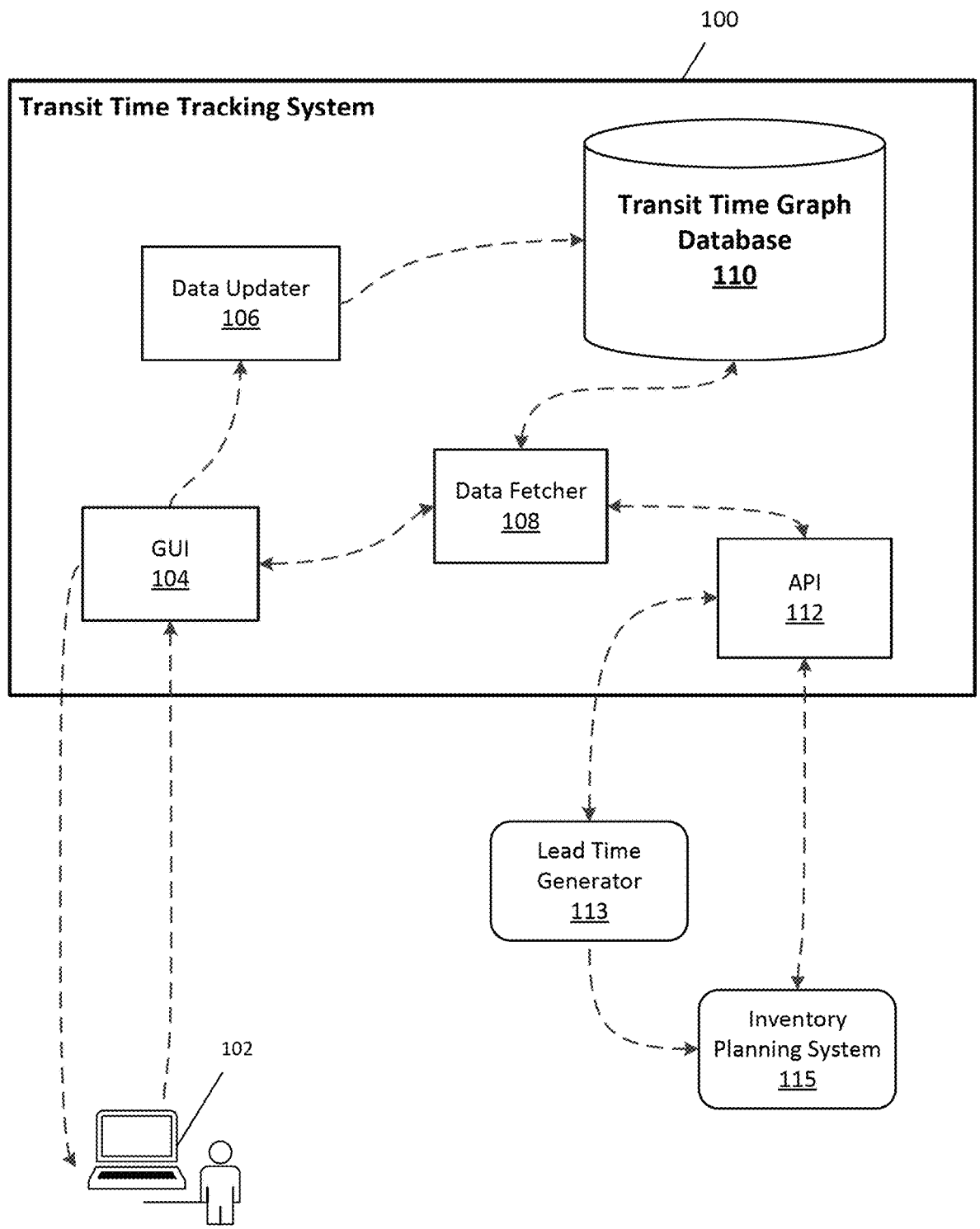
FIG. 1 illustrates a schematic diagram of an example transit time tracking system.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

ZIP codes (Zone Improvement Plan codes) are 5 digit numbers used to identify particular mailing zones. For purposes of this description, the term "ZIP code" will generally refer to the standard 5-digit ZIP codes used by the postal service unless otherwise specified. The term "3-digit ZIP code" refers to the first three digits of a 5-digit ZIP code. For purposes of this description that term is used to denote all ZIP codes having the first three digits in common. These ZIP codes will all be located within the same region. ZIP codes are utilized in this description to denote geographic areas. This is just an example as other methods of categorizing locations are possible.

Transit time estimates are critical inputs for many computing systems utilized to manage an enterprise supply chain. Just a few examples of such systems include transportation planning and execution systems, lead time estimation systems, and inventory planning systems. Transit times are a critical component of determining a lead time between the time when a purchase order is submitted to a vendor and the time when items from the purchase order are delivered to a final destination. Lead times are important for determining, for example, tradeoffs between speed, cost, and keeping buffer stock in inventory. Buffer stock is additional items that are stored at various locations within a retail supply chain to ensure that customer demand is met. The longer the lead time, the more buffer stock of items is needed.

Transit times can be estimated based on service level agreements of carriers. Historical shipping times can also be leveraged to estimate transit times between an origin and a destination. In a supply chain with hundreds or thousands of facility locations having hundreds or thousands of route segments traversing between the locations, it is difficult to manage all of the transit time estimate data.

The software system described herein is designed to track carrier transit times and carrier service level agreements to estimate transportation lead times and overall lead times. The system is capable of estimating lead times for all stages of transport including first mile, middle mile, and last mile transit. Different levels of service can be used between each origin and destination depending on the type of carrier and the type of transit. Data is stored at a more granular level in a graph database to more effectively track relationships between pieces of data. In some examples, the data is stored based on a 5-digit ZIP code of each location. A user interface can access the data from the graph database to easily present the data to a user. The user interface allows for 3-digit ZIP codes to be assigned to various user-defined regions to more easily manage the data on a broader level. Additionally, other computing systems (such as inventory planning) can access transit time information from the graph database through an application programming interface (API).

In example embodiments, the system described herein is capable of managing millions of origin and destination pairs and their intervening travel routes. The transit time graph database and accompanying graphical user interface allow for flexible management of the transit time information. Transit time information can be modified for multiple locations based on a common 3-digit ZIP code or groupings of 3-digit ZIP codes. Thus the system reduces the number of steps required to set up and maintain transit time information, reducing the amount of time needed to perform such tasks. At the same time, granularity down to a single 5-digit ZIP code is possible. This allows for precision in reporting estimated transit times, which in turn allows for more precise lead time estimations.

FIG. 1 illustrates a schematic diagram of a transit time tracking system 100. The transit time tracking system 100 is usable to store transit time estimates for origin/destination pairs. The transit time information provided by the transit time tracking system 100 is used by external systems, applications, and services. In particular, lead time estimating systems utilize transit times to aid in calculating lead times for shipments. The transit time tracking system 100 in the example of FIG. 1 includes a graphical user interface (GUI) 104, a data updater 106, a data fetcher 108, a transit time graph database 110 and an application programming interface (API) 112. The transit time tracking system 100 is accessible via the GUI 104 with a computing device 102. Alternatively, data consumers such as a lead time generator 113 and inventory planning system 115 can access the transit time tracking system 100 via the API 112.

The GUI 104 operates to generate a visual representation of the transit time information and the options available for manipulating that information. Users can interact with one or more features of the GUI 104 via a computing device 102 to access transit time data in the transit time graph database 110. In some embodiments, the GUI 104 operates to serve two major functions: updating transit time information and retrieving transit time information. Details of example GUIs are provided in FIGS. 6-9.

The data updater 106 operates to add and delete information in the transit time graph database 110. The data updater 106 receives new information from the GUI 104 that can be received from the computing device 102 or other computing systems. The data updater 106 may be implemented, for example, when service level agreements are updated by carriers and/or vendors. Additionally, if new vendors or carriers or service types become available within the supply chain, the data updater 106 adds new entries (nodes and edges) to the transit time graph database 110.

The data fetcher 108 operates to retrieve information from the transit time graph database 110. The data fetcher 108 can receive requests from a GUI 104 or an API 112. Requests received from the GUI 104 are typically prompted by input from a user of a computing device 102. For example, a request received through a GUI 104 may be to view an estimated transit time between an origin ZIP code and a destination ZIP code. A request received through the API 112 would typically originate from a data consumer, such as the lead time generator 113 or the inventory planning system 115 operating within the same enterprise supply chain.

Requests from the API 112 may be similar to those received from the GUI 104. For example, a data consumer may request through the API 112 information for a shipment originating at a first ZIP code and ending at a second ZIP code. The data fetcher 108 calls to the transit time graph database 110 to query the database for the requested information. This information is then delivered back through the GUI 104 or API 112. In the event that the request is less specific, such as requesting transit times based on specifying only a vendor, multiple transit times will be accessed that match the vendor ZIP code and have differing destination ZIP codes and shipping modes.

The transit time graph database 110 is a non-relational database that stores information as nodes with edges between the nodes representing relationships between the nodes. Examples of graph databases that could be utilized in the transit time tracking system include Neo4j, Amazon Neptune, JanusGraph, Microsoft Asure Cosmos, OrientDB, ArangoDB, and OpenLink Virtuoso.

The transit time graph database 110 includes ZIP code nodes for all ZIP codes in which facility locations are located within a supply chain. In some embodiments, the facility locations include vendors, distribution centers, and stores within a retail supply chain. Facility locations are joined to ZIP code nodes by edges indicating an association.

Edges between ZIP code nodes represent transit lanes or transit routes between those ZIP codes. The edges are directional relationships indicating which node is the origin and which is the destination. The values for the edges between ZIP code nodes are transit times based on estimates or promises from carriers. In some embodiments, the transit times are provided in hours. In some embodiments, more than one edge exists between two ZIP code nodes to represent different shipping modes having different transit times.

In the event new facility locations or vendor locations are added to the transit time graph database 110, transit times can be extrapolated from other locations having the same ZIP code as the new location. Similarly, if new 5-digit ZIP codes are added to the database, transit times can be extrapolated from other ZIP codes sharing the same first 3 digits.

The API 112 operates to mediate communications between the transit time tracking system 100 and external computing systems. In the example of FIG. 1, these external systems are includes a lead time generator 113 and an inventory planning system 115. Computing systems that wish to utilize the transit time information can call to the API 112 to request that information be fetched from the transit time graph database 110. The retrieved information is presented back to the data consumer by the API 112. Essentially the API 112 serves as an intermediary between these external data consumers and the transit time tracking system 100, translating computer language between the different computing systems. Examples of some external computing systems that might consume data from the transit time tracking system 100 include performance management systems, inventory planning systems, transportation management systems, inventory management systems, and demand forecasting systems.

The lead time generator 113 operates to estimate overall lead times for transporting items from an origin to a destination. For example, the overall time that it takes for a purchase order to be processed by a vendor, shipped, and processed at a destination distribution center can be calculated by the lead time generator 113 using information from the transit time tracking system 100.

The inventory planning system 115 operates to plan and execute how inventory is distributed within a supply chain. Decisions about how much inventory to stock at a given location are informed in part on the estimated lead times for obtaining additional stock from a vendor or transit times for moving inventory from one location to another within the supply chain. Therefore, the inventory planning system 115 relies on information from the lead time generator 113 and transit time tracking system 100.

Figure 2:
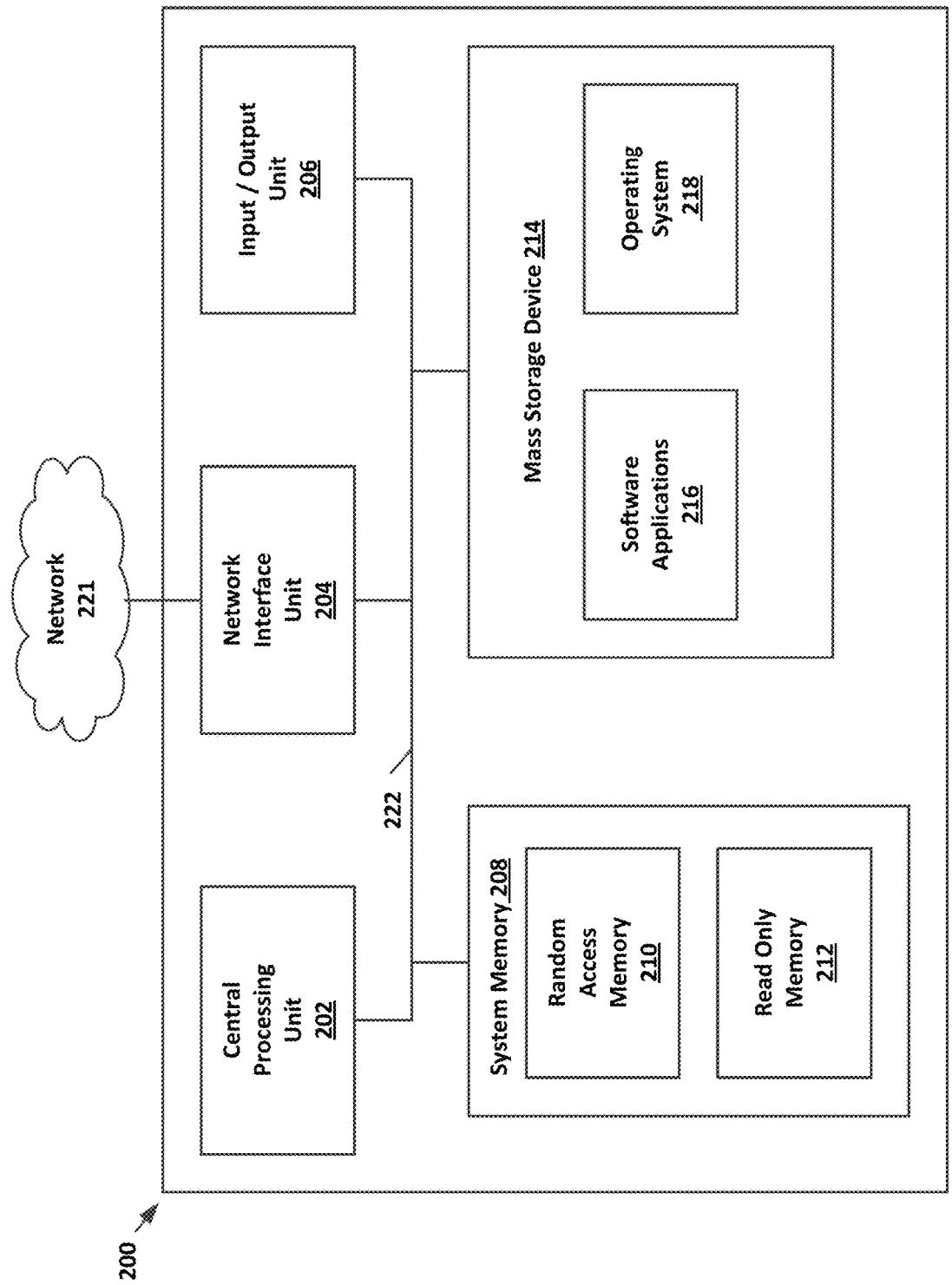
FIG. 2 illustrates a block diagram of an example computing device usable to implement aspects of the system of FIG. 1.

Referring now to FIG. 2, an example block diagram of a computing device 200 is shown that is useable to implement aspects of the transit time tracking system 100 of FIG. 1. For example, the computing device 200 can be used to access the transit time tracking system 100 via a GUI 104 as shown with the computing device 102 of FIG. 1.

In the embodiment shown, the computing device 200 includes at least one central processing unit ("CPU") 202, a system memory 208, and a system bus 222 that couples the system memory 208 to the CPU 202. The system memory 208 includes a random access memory ("RAM") 210 and a read-only memory ("ROM") 212. A basic input/output system that contains the basic routines that help to transfer information between elements within the computing device 200, such as during startup, is stored in the ROM 212. The computing system 200 further includes a mass storage device 214. The mass storage device 214 is able to store software instructions and data such as those for executing the functions of the transit time tracking system 100.

The mass storage device 214 is connected to the CPU 202 through a mass storage controller (not shown) connected to the system bus 222. The mass storage device 214 and its associated computer-readable storage media provide non-volatile, non-transitory data storage for the computing device 200. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 202 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 200.

According to various embodiments, the computing device 200 can operate in a networked environment using logical connections to remote network devices through a network 221, such as a wireless network, the Internet, or another type of network. The computing device 200 may connect to the network 221 through a network interface unit 204 connected to the system bus 222. It should be appreciated that the network interface unit 204 may also be utilized to connect to other types of networks and remote computing systems. The computing device 200 also includes an input/output controller 206 for receiving and processing input from a number of other devices, including a touch user interface display screen, or another type of input device. Similarly, the input/output controller 206 may provide output to a touch user interface display screen or other type of output device.

As mentioned briefly above, the mass storage device 214 and the RAM 210 of the computing device 200 can store software instructions and data. The software instructions include an operating system 218 suitable for controlling the operation of the computing device 200. The mass storage device 214 and/or the RAM 210 also store software instructions, that when executed by the CPU 202, cause the computing device 200 to provide the functionality discussed in this document. For example, the mass storage device 214 and/or the RAM 210 can store software instructions that, when executed by the CPU 202, cause the computing system 220 to display a GUI 104 and receive input from a user.

Figure 3:
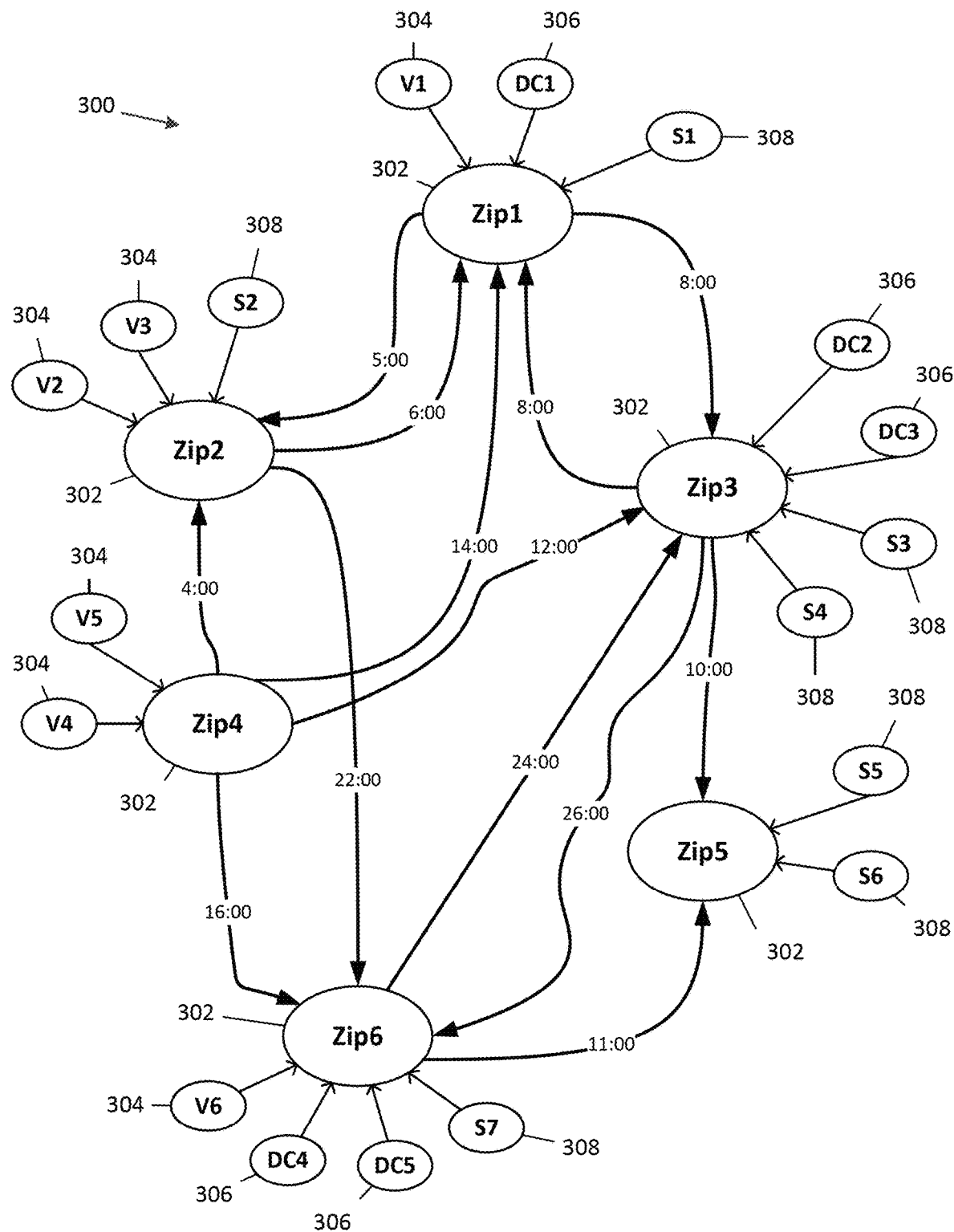
FIG. 3 illustrates a schematic diagram of a simplified example of a graph database usable in the system of FIG. 1.

FIG. 3 is a schematic diagram representing an example graph database 300 of transit times. In this simplified example, there are six ZIP codes and one transit mode between each origin and destination. In practice, a graph database could include thousands of nodes for ZIP codes and there could be multiple different transit mode options between an origin and destination. In the example graph database 300 of FIG. 3, each ZIP code node 302 is associated with one or more vendor nodes 304, distribution center nodes 306, and store nodes 308. The ZIP code nodes 302 each represent a five digit ZIP code.

The graph database includes directed relationships between nodes represented as arrows. These arrows represent edge values between the nodes. Vendor nodes 304, distribution center nodes 306, and store nodes 308 are connected to ZIP code nodes 302 having a matching ZIP code. There is no value other than the direction arrow between the vendor nodes 304, distribution center nodes 306, and store nodes 308 and the ZIP code nodes 302. The edge values between ZIP code nodes 302 represent estimated transit times 310. In this example, the estimated transit times 310 are provided in hours. The estimated transit times 310 also have a directional component represented as arrows indicating the direction of transit between the ZIP code nodes 302.

Figure 4:
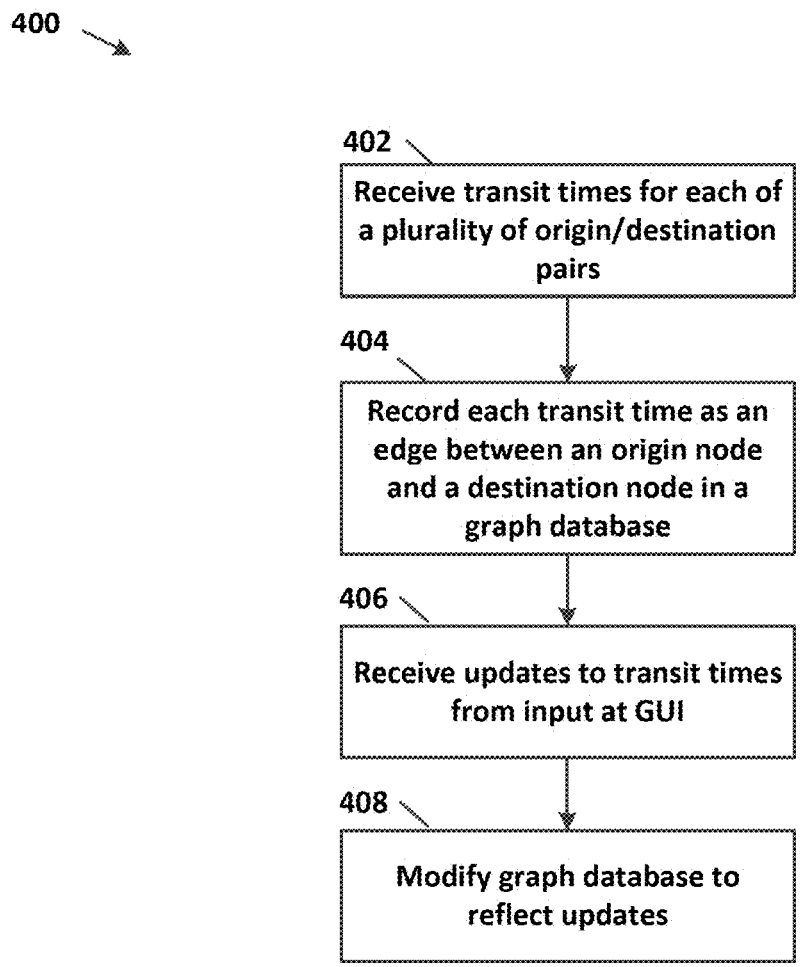
FIG. 4 is a flow chart of an example method of updating a transit time graph database.

FIG. 4 is a flow diagram of an example method 400 of updating transit time data in a graph database. In some embodiments, the data updater 106 of the transit time tracking system 100 is utilized to update the transit time graph database 110. The method 400 describes both initial setup of the transit time graph database 110 and modifying the transit time graph database 110 as updated transit time information becomes available. In some embodiments, updates are manually entered by a user through the GUI 104. In some embodiments, updates could be received from other computing systems for automatic processing by the data updater 106. For example, third party systems utilized by carriers could communicate updated transit time estimates to the transit time tracking system as changes are made to service level agreements (SLAs).

At operation 402, transit times for each of a plurality of origin/destination pairs is received. In some embodiments, the data updater 106 receives transit times for transporting items between an origin and a destination via at least one shipping mode. The data updater 106 communicates the transit time information to the transit time graph database 110. In some embodiments, the data updater 106 receives the transit time information from inputs received at the GUI 104.

At operation 404, each transit time is recorded as an edge between an origin node and a destination node in a graph database. In some embodiments, more than one transit time is recorded between a given origin node and destination node because more than one shipping mode is possible. In some embodiments, the origin node is an origin ZIP code and the destination node is a destination ZIP code.

Figure 9:
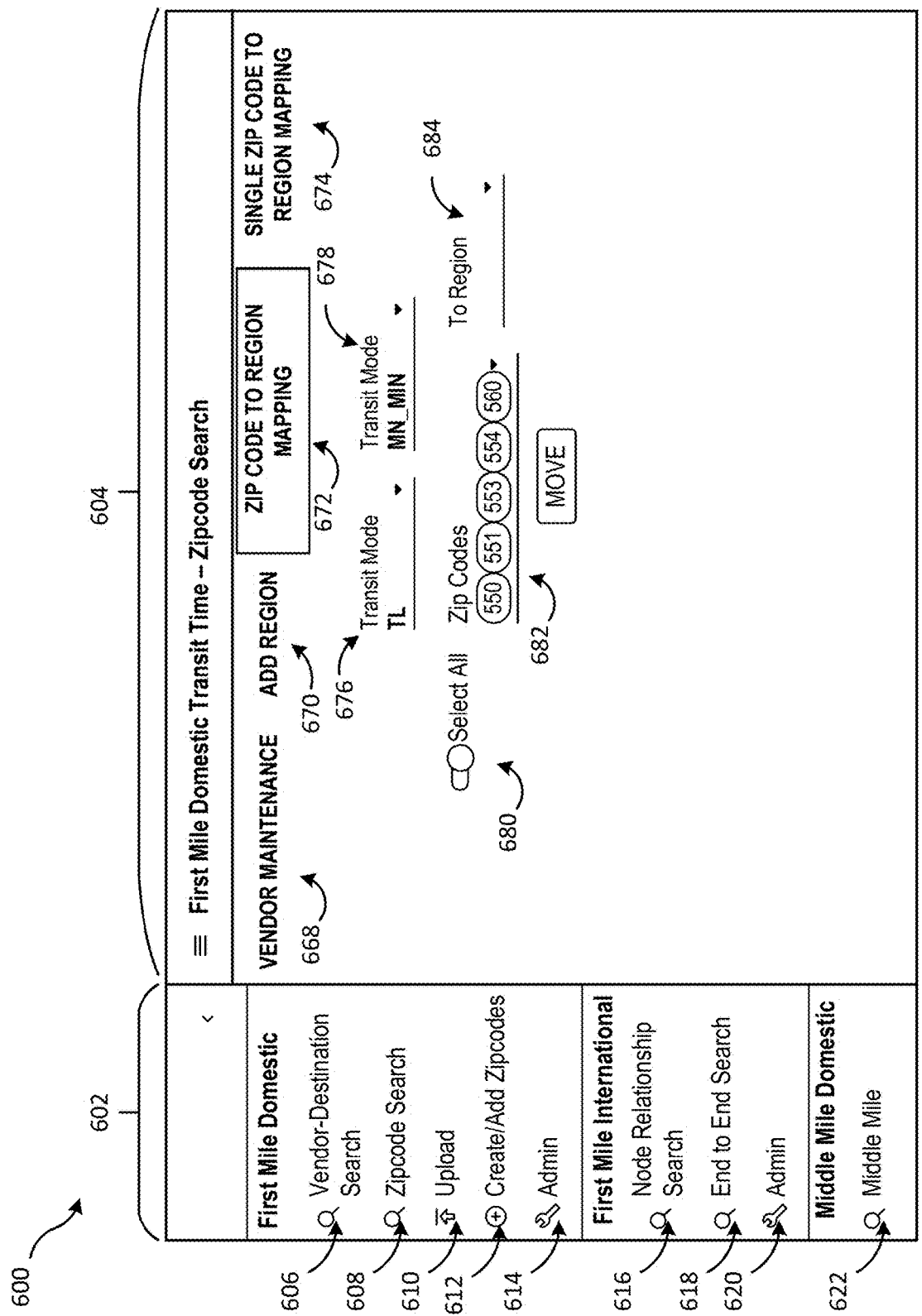
FIG. 9 illustrates an example graphical user interface usable to update a transit time graph database.

At operation 406, updates to transit times are received from input at a GUI. In some embodiments, updates occur when carriers update service level agreements for shipping items within a supply chain. Updates are entered at a computing device 102 via the GUI 104. In some embodiments, updates to transit times can be entered based on a five digit ZIP code. In some embodiments, updates can be managed based on groupings of ZIP codes based on region. In some embodiments, updates can be managed based on three digit ZIP codes. Examples of a GUI 600 is shown in FIG. 9.

At operation 408, the graph database is modified to reflect the updates. In some embodiments, the data updater 106 communicates transit time updates to the transit time graph database 110. Additional transit times can be added between existing ZIP code nodes. New ZIP code nodes can be added along with transit times between the new nodes and existing nodes. In some embodiments, transit times between existing nodes are updated to reflect new estimates or promised transit times received from carriers.

Figure 5:
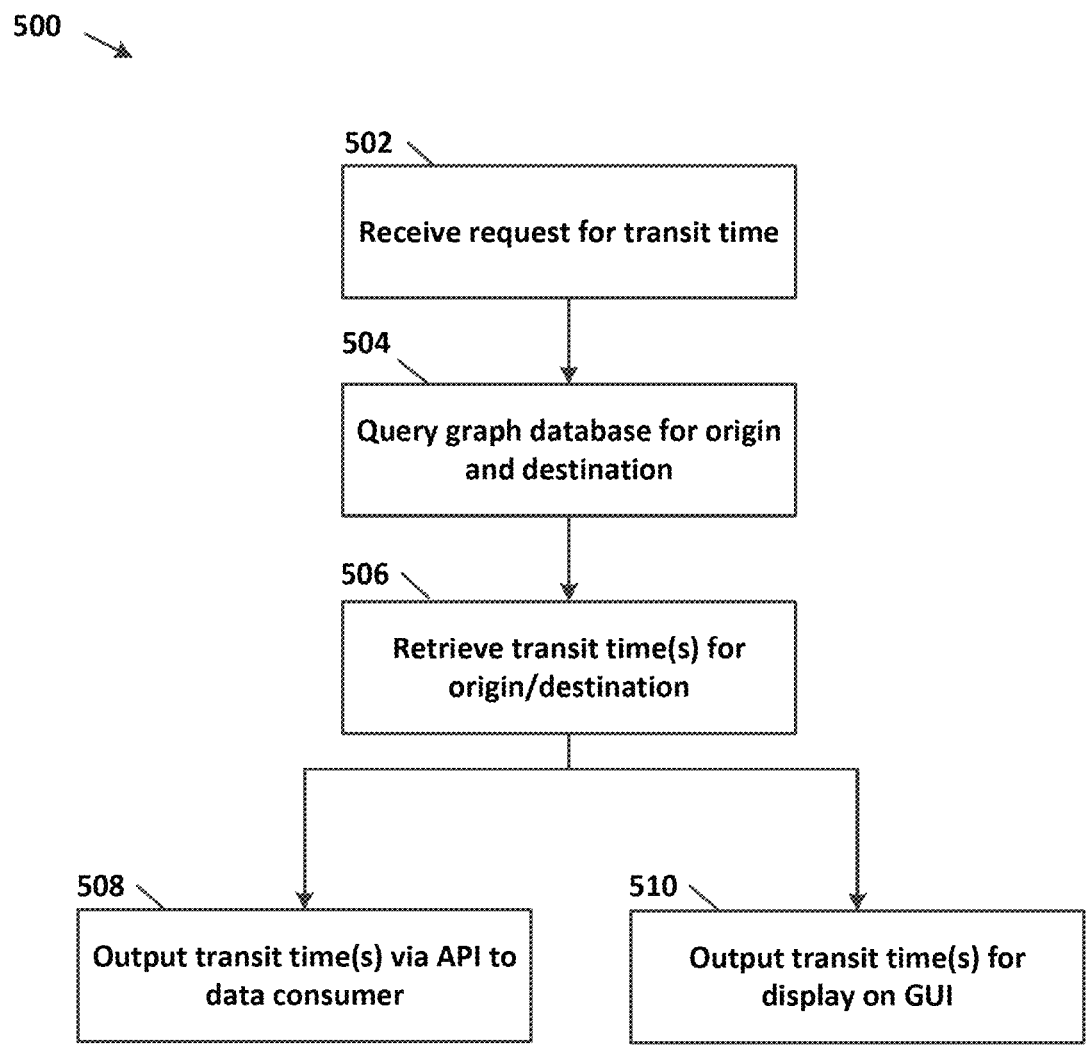
FIG. 5 is a flow chart of an example method of retrieving transit time estimates.

Referring now to FIG. 5, a flow diagram of an example method 500 of retrieving transit times is described. In some embodiments, the method 500 is performed by the transit time tracking system 100 of FIG. 1. In particular, the data fetcher 108 is utilized to query the transit time graph database 110. This could be in response to requests received from the GUI 104 or the API 112.

At operation 502, a request for one or more transit times is received. In some embodiments, the request is received at the data fetcher 108. The request includes an origin and a destination. In some embodiments, the request specifies an origin ZIP code and a destination ZIP code. In some embodiments, the ZIP codes are a five digit ZIP code. In some embodiments, the request specifies a particular facility location for both the origin and destination. Based on the facility location, a ZIP code of the location is determined and used by the data fetcher 108 for the request. In some embodiments, the facility location refers to a particular vendor, distribution center, or retail store location.

In some embodiments, the request specifies a particular transit mode type. The transit mode type could specify a type of truckload such as a full truckload, less than truckload, or consolidated truckload. Shipping modes can further include air, train, or multi-modal transport. The transit mode type could also specify a particular carrier or level of service offered by a carrier. If particular transit modes are not specified in the request, more results for different transit modes will be supplied in later steps of the method 500. If the request is specific to a particular transit mode, there will be a single transit time retrieved in response to the query.

In some embodiments, the request is received from a computing device 102 through a GUI 104. A user can enter a query through the GUI 104 for transit time information. In some embodiments, a user can request transit times for more than one pair of origins and destinations at one time.

Figure 6:
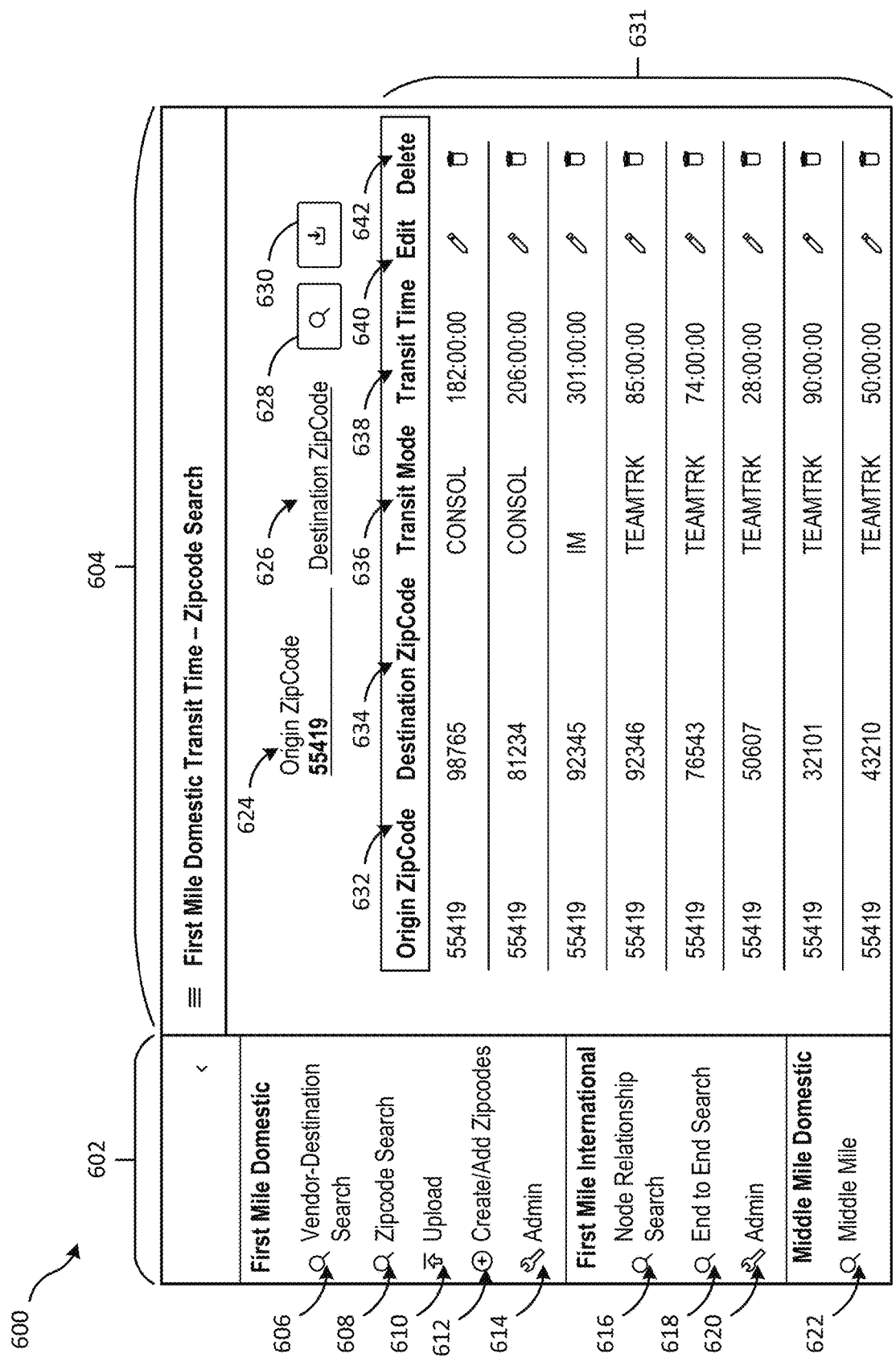
FIG. 6 illustrates an example graphical user interface usable to retrieve transit time estimates.
Figure 8:
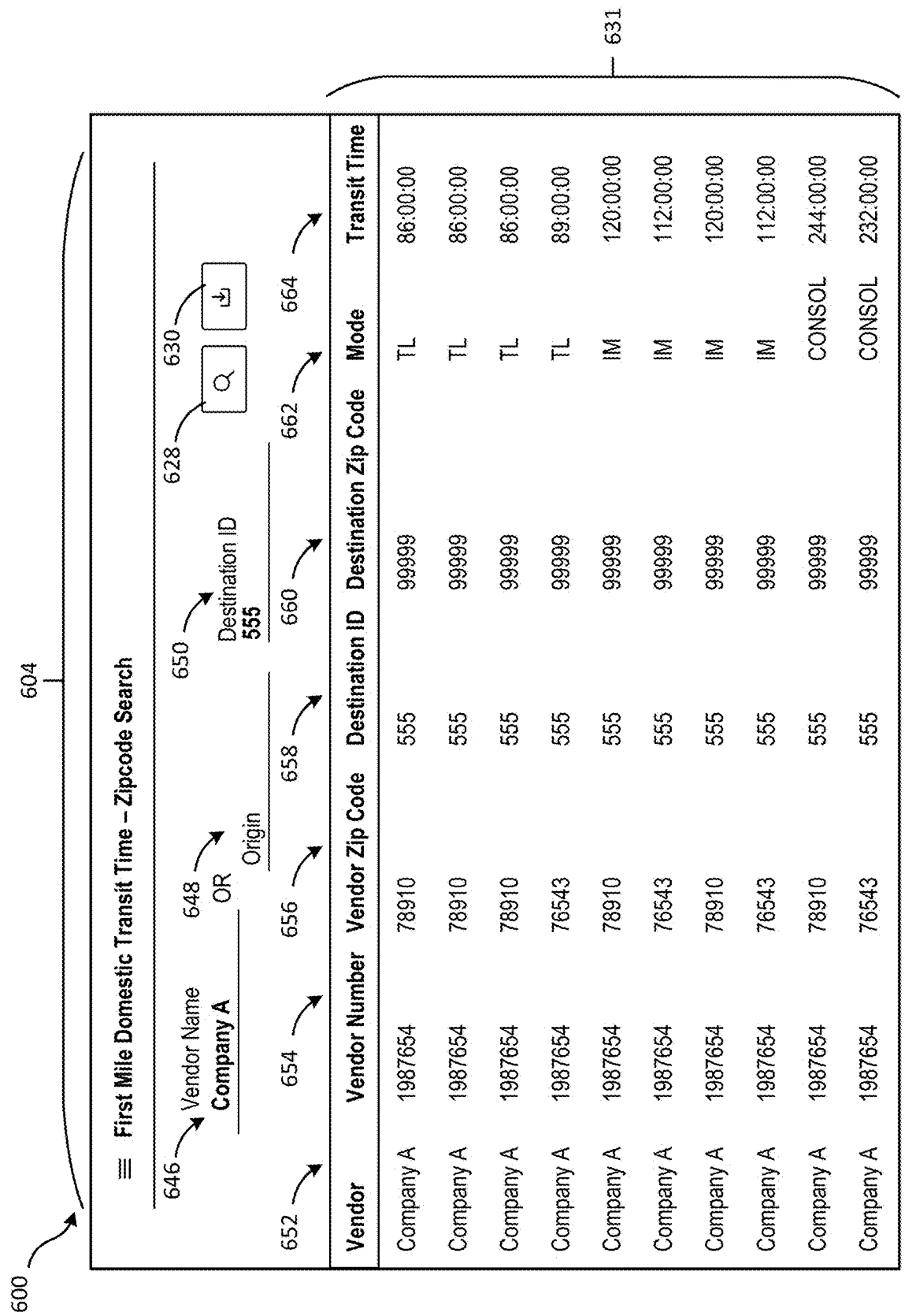
FIG. 8 illustrates another view of the graphical user interface of FIG. 6.

At operation 504, the graph database is queried. In some embodiments, the data fetcher 108 of FIG. 1 queries the transit time graph database 110. Based on the request received at the data fetcher 108, the transit time graph database 110 is queried for one or more transit times. The query is based on an origin ZIP code and a destination ZIP code. In some embodiments ZIP codes are included in the request. In other embodiments, the request includes an origin location and a destination location. The ZIP code of those locations is determined before issuing the query to the database. In some embodiments, a vendor management system supplies the requested ZIP codes. In some embodiments, the query only includes an origin location or a destination location. In such instances the response to the query will be a list of all possible locations that can be shipped to or from the queried location. An example of this is shown in FIG. 6. A similar example is shown in FIG. 8 where the query only includes the vendor name.

Depending on the type of graph database, various query languages can be used by the data fetcher 108 to complete the request. Examples include Cypher, SPARQL, Gremlin, graphQL, and AQL. In one example, if the graph database is a Neo4j database, the query language could be Cypher.

At operation 506, one or more transit times are retrieved from the graph database. In some embodiments, estimated transit times for a requested origin and destination are retrieved. In some embodiments, for one origin and destination pair, multiple transit times are retrieved for multiple different shipping modes available between the origin and destination. If only one of the origin and destination are specified, all possible locations to which shipments could be sent to or received from are retrieved from the graph database.

If the request was received from an API, the method 500 proceeds to operation 508. If the request was received through a GUI, the method 500 proceeds to operation 510.

At operation 508, the requested transit time data is output through an API to a data consumer. In the example of FIG. 1, the data fetcher 108 communicates estimated transit times through the API 112 to lead time generator 113 or inventory planning system 115. In some embodiments, transit times are communicated to other data consumers such as transportation planning systems.

Figure 7:
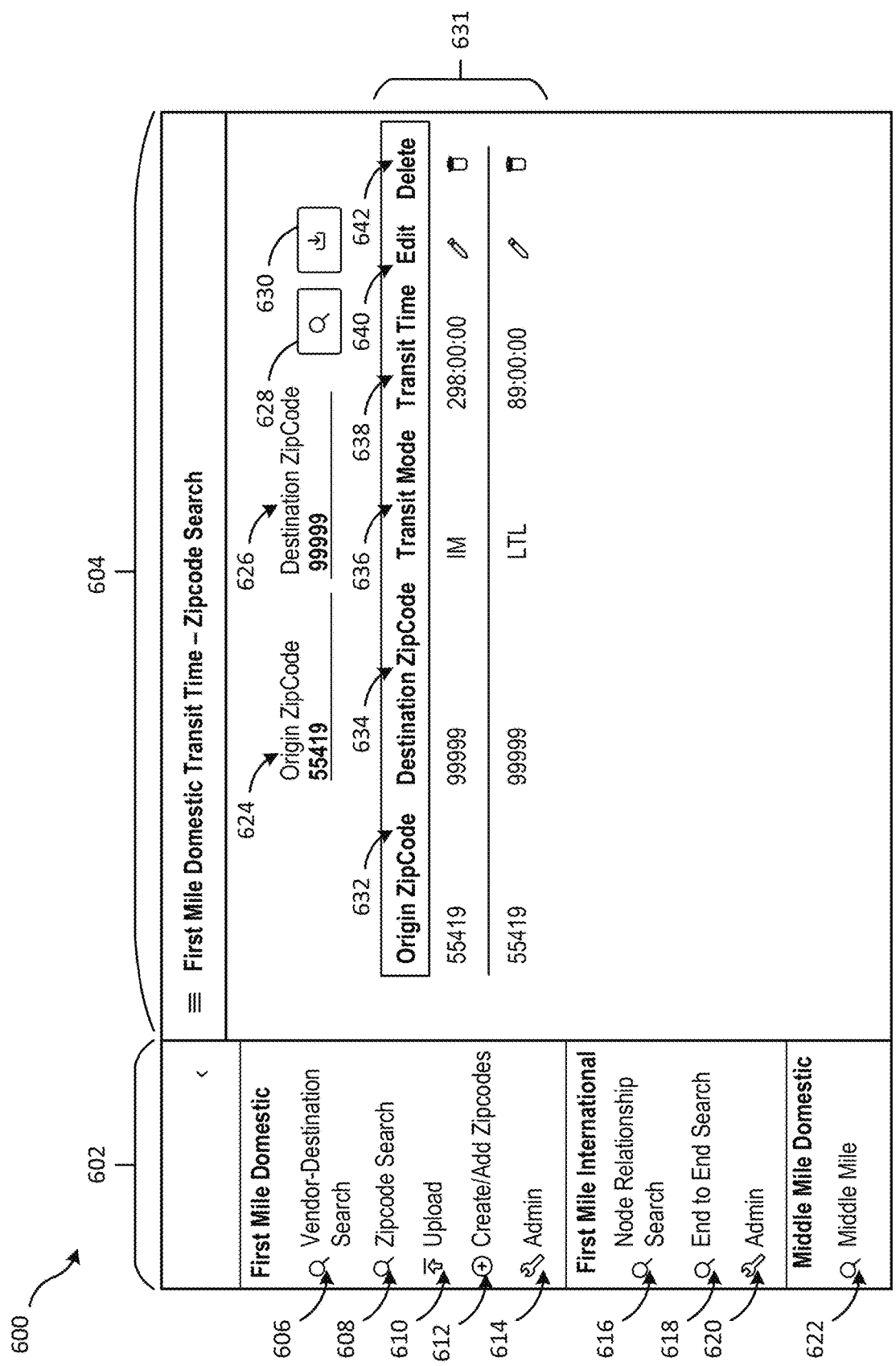
FIG. 7 illustrates another view of the graphical user interface of FIG. 6.

At operation 510, requested transit time data is output for display on a GUI. In the example of FIG. 1, the data fetcher 108 communicates estimated transit times for display on the GUI 104, which can be viewed on the display of a computing device 102 by a user. Example displays of GUIs are shown in FIGS. 6-8.

FIG. 6 illustrates an example graphical user interface (GUI) 600 usable to retrieve transit time estimates. The GUI 600 includes a menu bar 602 and an information display area 604.

The menu bar 602 operates to present options for a plurality of functions that can be implemented using the GUI 600. In the example of FIG. 6, these options include First Mile Domestic functions, First Mile International functions, and Middle Mile functions. These are merely examples and other functions are possible such as Last Mile functions. First Mile Domestic functions include "Vendor-Destination Search" 606, "ZIP code Search" 608, "Upload" 610, "Create/Add ZIP codes" 612, and Admin 614.

The "Vendor-Destination Search" 606 presents prompts to a user on the information display area 604. Fields are presented to the user to enter information relevant to a request for transit time estimates. The estimates are for transit times between a vendor and a facility location within a supply chain.

The "ZIP code Search" 608 presents similar prompts on the information display area 604 for a user to enter query inputs. Transit time estimates are retrieved based on one or both of an origin ZIP code and a destination ZIP code.

The "Upload" 610 function presents prompts on the information display area 604 to upload data to the graph database.

The "Create/Add ZIP codes" 612 function presents prompts on the information display area 604 for a user to enter new ZIP code information into the graph database. In some embodiments, the user can adjust associations between ZIP codes and particular regions.

The "Admin" 614 function operates to present options on the information display area 604 for a user to adjust settings for operation of the transit time graph database 110.

First Mile International functions include "Node Relationship Search" 616, "End to End Search" 618 and "Admin" 620. These functions are applicable to shipments of items from vendors abroad.

The "Node Relationship Search" 616 functions to present prompts on the information display area 604 for a user to enter node inputs and retrieve information about relationships between nodes in a supply chain.

The "End to End Search" 618 function presents prompts on the information display area 604 for a user to enter one or both of an origin and a destination to retrieve transit time information. For example, a vendor identifier and a distribution center identifier could be entered. Transit times for different shipping modes would be retrieved for various shipping segments required to transport items from the vendor to the distribution center.

The "Admin" 620 function operates similarly to the "Admin" 614 function in First Mile Domestic.

The only "Middle Mile Domestic" function displayed is "Middle Mile" 622. This function presents prompts on the information display area 604 for a user to enter inputs to retrieve information relevant to middle mile transit times (e.g. movements between distribution centers).

In the example shown in FIG. 6, the ZIP code Search 608 function has been selected from the menu bar 602. A top portion of the information display area 604 includes an "Origin ZIP code" field 624 and a "Destination ZIP code" field 626. A search button 628 and a download button 630 are also included. A lower portion of the information display area includes a search results table 631.

Additionally in the example shown, "55419" has been input into the Origin ZIP code field 624 and the Destination ZIP code 626 field has been left blank. Input to these fields could be accomplished through the GUI 104 using an input device of the computing device 102. Example input devices include a keyboard, a touchscreen, a stylus, voice input, and a mouse. The ZIP codes could be input with typing or by selecting from a menu. A user has selected the search button 628 to initiate retrieval of the requested transit time information. Selection could be made by clicking a mouse or touching a touchscreen over the search button 628. In some embodiments, selecting the search button 628 prompts the data fetcher 108 to query the transit time graph database 110 for the requested ZIP code as an origin.

The search results table 631 has been populated with the results of the search initiated by the user. The search results table 631 includes columns for "Origin ZIP code" 632, "Destination ZIP code" 634, "Transit Mode" 636, "Transit Time" 638, "Edit" 640, and "Delete" 642. Using the first row as an example, the Origin ZIP code 632 is 55419, which matches the ZIP code entered into the Origin ZIP code 624 field. The Destination ZIP code 634 is 98765. Because no ZIP code was specified in the destination ZIP code field 626, all possible destination ZIP codes are presented in the search results table 631. The Transit Mode 636 indicates the shipping mode utilized between the origin and destination. In some embodiments, the transit mode is selected from full truckload, less than truckload, consolidated load, and intermodal. In the example of the first row, the transit mode is "CONSOL" which stands for consolidated load. The transit time 638 is the estimated amount of time it is expected to take to transport items from the origin to the destination. In this example, the transit time is 182 hours. Selecting the pencil symbol under the edit 640 column causes the user interface to display a different view for modifying the transit time. Selecting the trash can symbol under the Delete column 642 deletes the transit time entry in the graph database.

FIG. 7 illustrates another view of the graphical user interface 600 of FIG. 6. In this example, the field for Destination ZIP code 626 has been filled with "99999." Compared to FIG. 6, the search results table 631 shows fewer results. The displayed results are limited to those matching both the origin ZIP code and destination ZIP code. The top result has "IM" in the Transit Mode 636 column, indicating that the transit time is for an intermodal shipping mode. The transit time 638 column indicates that the estimated transit time is 298 hours. The bottom result shows that there is a second shipping mode available between the origin and destination. The transit time for a less than truckload (LTL) shipment is 89 hours.

FIG. 8 illustrates another view of the graphical user interface 600 of FIG. 6. In this view, only the information display area 604 is shown. This view would be displayed after a user has selected the Vendor-Destination Search 606 function. A Vendor Name field 646, Origin field 648, and Destination ID field 650 are shown at the top of the information display area 604 along with the search button 628 and download button 630. In this example, a user has input "Company A" into the Vendor Name field 646 and "593" into the Destination ID field 650.

The search results table 631 shows transit times for all possible origins and destinations that match the requested inputs. The search results table 631 includes columns for "Vendor Name" 652, "Vendor Number" 654, "Vendor ZIP code" 656, "Destination ID" 658, "Destination ZIP code" 660, "Mode" 662, and "Transit Time" 664. In this example, multiple transit times are displayed as rows, the transit times matching the criteria of "Company A" as the vendor and "593" as the destination ID. Where multiple transit times are stored, one or more such transit times may be returned in response to a search or request (e.g., all transit times may be provided, or an average case, or worst case transit time may be provided).

FIG. 9 illustrates a view of an example graphical user interface 600 usable to update a transit time graph database. Specifically, combinations of vendors with transit modes, starting/ending regions, and ZIP codes may be provided.

In this example, the First Mile Domestic function of "Admin" 614 has been selected. The information display area 604 shows options for modifying how the graph database is managed. Options are shown for "Vendor Maintenance" 668, "Add Region" 670, "ZIP code to Region Mapping" 672, and "Single ZIP code to Region Mapping" 674.

The "Vendor Maintenance" 668 option, when selected, displays options to a user for modifying information relevant to vendors. For example specific details relevant to a particular vendor may be provided (e.g., valid transit modes, starting regions, or other vendor details).

The "Add Region" 670 option, when selected, displays options to a user for adding groupings of 3- or 5-digit ZIP codes. These groupings can be defined by geographic area such as state or metropolitan area.

The ZIP code to Region Mapping 672 and Single ZIP code to Region Mapping 674 options allow for single ZIP codes or groups of ZIP codes to be added to or removed from region groupings. In the example of FIG. 9, the "ZIP code to Region Mapping" 672 function has been selected.

The information display area 604 also includes a "Transit Mode" field 676, "From Region" field 678, a "Select All" toggle 680, a "ZIP code" field 682, and a "To Region" field 684. Here, the transit mode "TL" has been selected in the Transit Mode field 676, indicating that truckload transit times are being managed. "MN_MIN" has been entered into the From Region field 678, indicating that transit times in the Minnesota region are being managed.

In the example shown, 3-digit ZIP codes are entered or selected at the ZIP code field 682. In this example, the Select All toggle 680 has been activated. This automatically populates the ZIP code field 682 with all 3-digit ZIP codes associated with the selected region.

Figure 10:
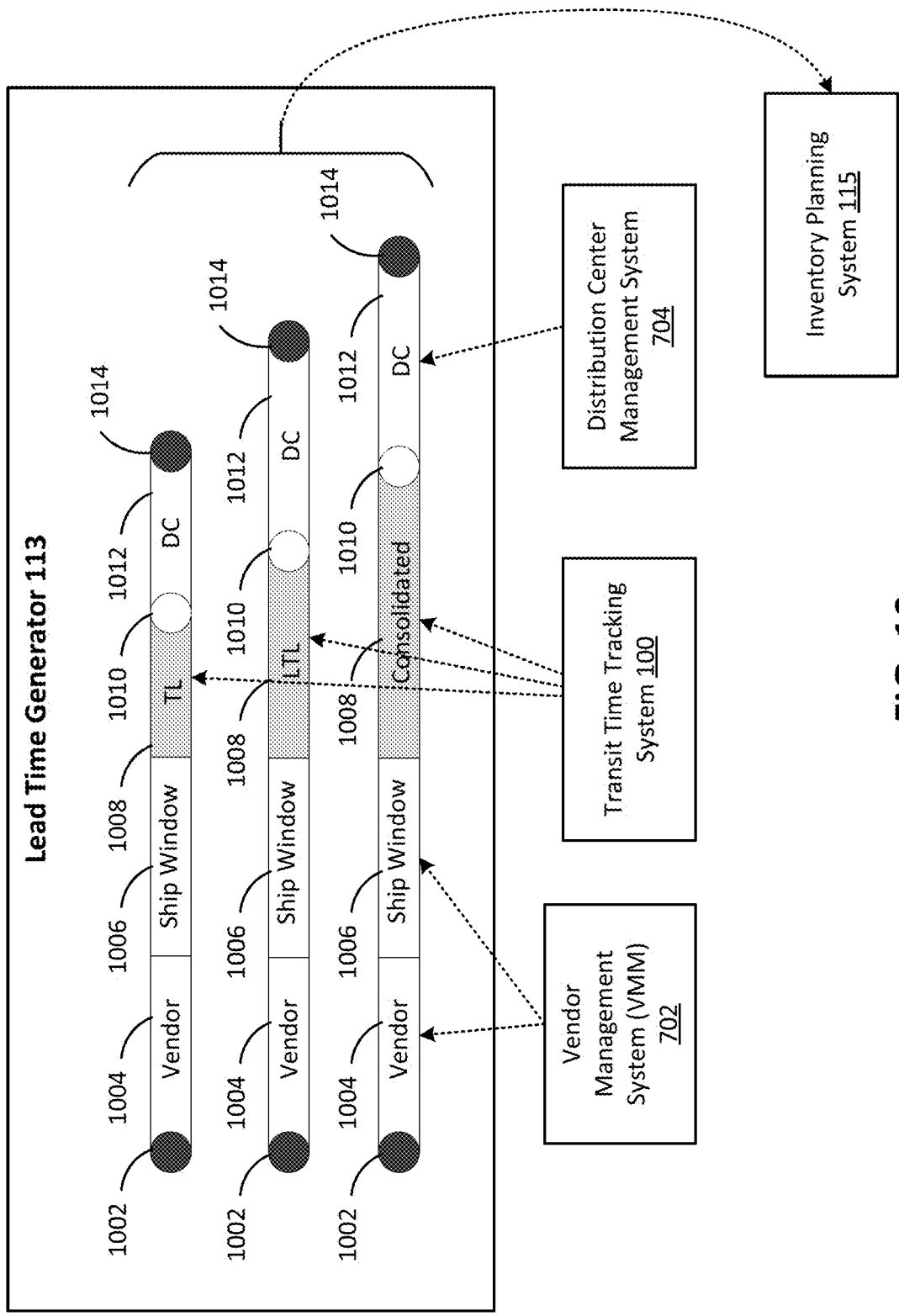
FIG. 10 illustrates a schematic diagram of an example lead time generator.

FIG. 10 illustrates a schematic diagram of an example lead time generator 113. The lead time generator 113 receives information from a vendor management system 702, a transit time tracking system 100, and a distribution center management system 704. Generated lead times are output to an inventory planning system 115.

FIG. 10 includes diagrams showing how the transit times are utilized to estimate lead times. The black circle at the left indicates when a purchase order (PO) 1002 is received. This starts the clock for the overall lead time estimation. Vendor processing 1004 follows along with a ship window 1006. The time estimates for vendor processing 1004 and ship window 1006 are provided by the vendor management system 702. To the right of the ship window 1006 is a shaded box representing transit time 1008. The shipping mode is indicated in each transit time 1008 box. Transit times are provided by the transit time tracking system 100. To the right of the transit time 1008 is a white circle representing the estimated in-yard time 1010 that the shipment will be in the shipping yard of the distribution center. Distribution center processing 1012 represents the time needed for the shipment to be processed and unloaded at the distribution center. The distribution center processing 1012 time is provided by the distribution center management system 704. Finally, the black circle to the right represents the estimated receipt time 1010. The total lead time estimates are output to an inventory planning system 115.

Figure 11:
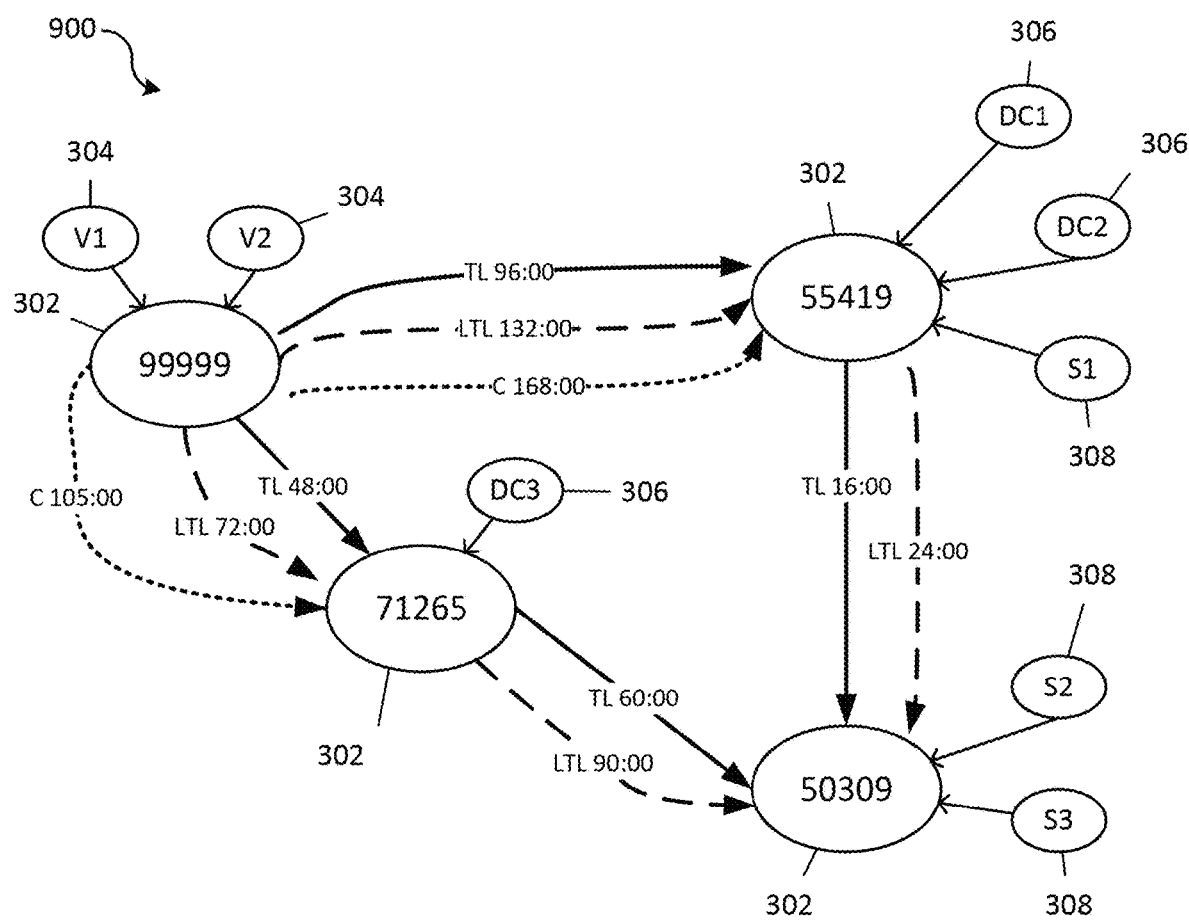
FIG. 11 illustrates a schematic diagram of a portion of a transit time graph database.

FIG. 11 illustrates a schematic diagram 900 of a portion of a transit time graph database. Similar to FIG. 3, each ZIP code node 302 is linked to its associated vendor nodes 304, distribution center nodes 306, and store nodes 308. Edges between the ZIP code nodes 302 indicate estimated transit times for one or more shipping modes. In this example, four ZIP codes are represented: 99999, 55419, 71265, and 50309.

Figure 12:
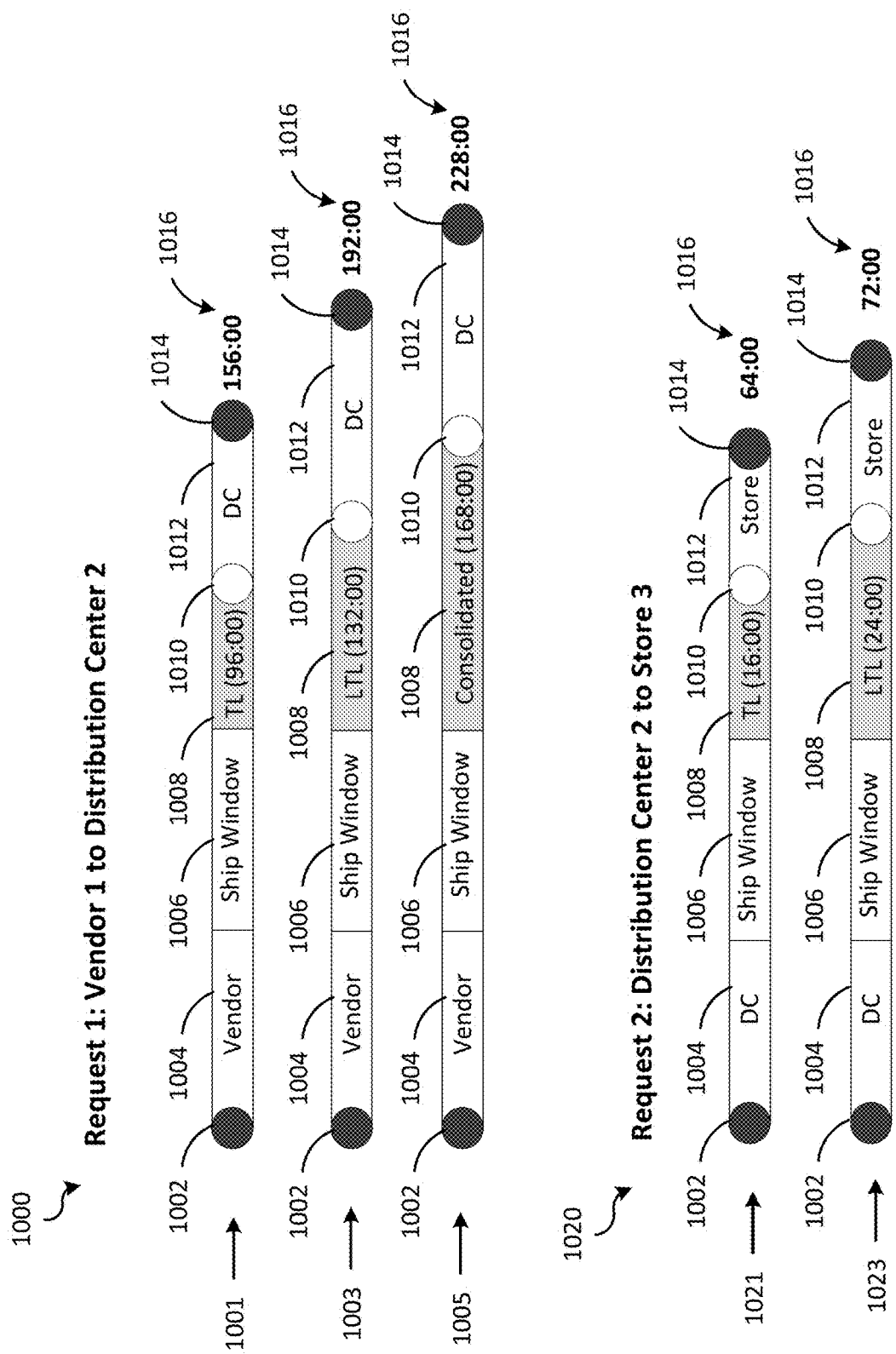
FIG. 12 illustrates a schematic representations of lead time estimates generated based on the portion of the transit time graph database of FIG. 11.

FIG. 12 includes diagrams showing how the transit times illustrated in FIG. 11 are utilized to estimate lead times. The lead time diagrams (1001, 1003, 1005, 1021, 1023) represent different stages of shipping and handling that happen between the time when a purchase order (PO) 1002 is received and the estimated receipt time 1010. The total lead time 1016 is provided to the right of each diagram.

The first group of estimated lead times is shown in response to a first request 1000. This first request is for lead times between Vendor 1 and Distribution Center 2. Referring back to FIG. 11, vendor 1 is linked to ZIP code 99999, indicating that its location is within the ZIP code area of 99999. Distribution center 2 is in ZIP code 55419. The schematic diagram 900 in FIG. 11 shows three different arrows pointing from the ZIP code node 302 for 99999 to the ZIP code node 302 for 55419. Different shipping modes are represented by different amounts of hashing in the lines. The transit times are indicated on each arrow along with an abbreviated label for the shipping mode type.

A first, solid arrow in FIG. 11 indicates that the transit time for a full truckload (TL) is 96 hours. The corresponding diagram shows a first scenario diagram 1001 in FIG. 12 including the transit time 1008 amongst all other phases of the process of sending a shipment from the vendor to the distribution center. The total lead time 1016 represented by the first diagram 1001 is 156 hours.

A second, long dashed arrow indicates that the transit time for a less than full truckload (LTL) is 132 hours. The corresponding second scenario diagram 1003 in FIG. 12 shows that the total lead time 1016 including the transit time 1008 of 132 hours is 192 hours.

A third, short dashed arrow indicates that the transit time for a consolidated load is 168 hours. The corresponding third scenario diagram 1005 in FIG. 12 shows that the total lead time 1016 including the transit time 1008 of 168 hours is 228 hours.

Similar total lead time determinations are available between various endpoints using the database and shipping method determinations. As seen in FIG. 12, lead time determinations may be made between a vendor and distribution center, or between a distribution center and a store (as seen in scenarios 1021, 1023). Other examples include shipments between two distribution centers. In any case, time at the starting point (vendor or distribution center), shipment preparation time, a transit time, and unpacking/processing time at the endpoint are calculated as part of an overall lead time calculation. Other calculations for multi-modal deliveries or importing items from overseas include additional steps for processing and shipment that need to be estimated, but the same concepts apply.

Figure 13:
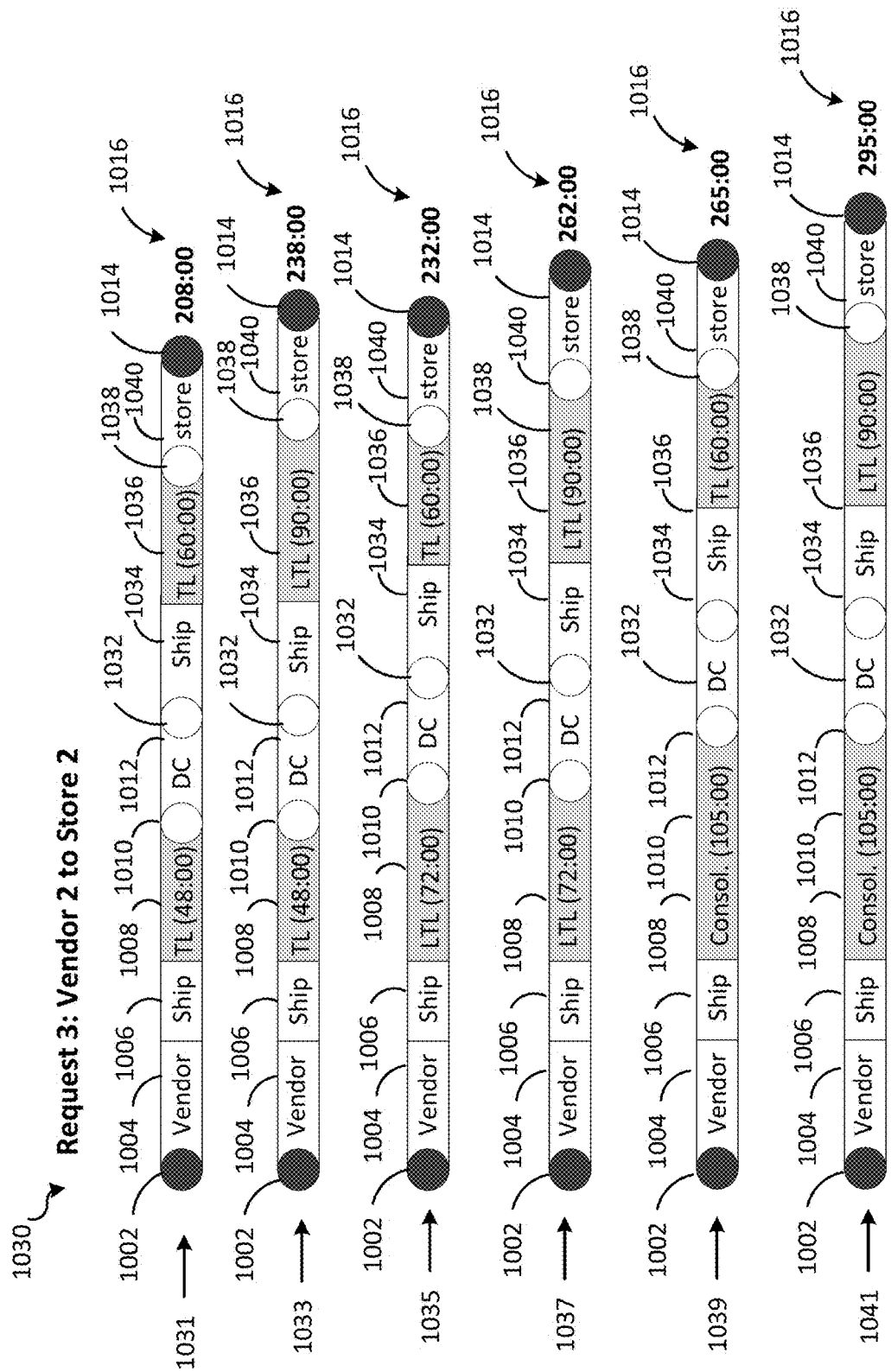
FIG. 13 illustrates additional schematic representations of lead time estimates generated based on the portion of the transit time graph database of FIG. 11.

Referring to FIG. 13, it is noted that similar calculations for lead times 1016 across shipping scenarios 1031, 1033, 1035, 1037, 1039, and 1041 may be performed not just across locations (e.g., between two ZIP codes), but across sets of more than two such endpoints. In this example, a lead time calculation may be determined from a vendor to a store by determining time of processing by the vendor to prepare an order, a shipping window, a transit time (according to an expected or estimated shipping method, from among the variety of shipping methods discussed above), processing time at a distribution center, followed by a further shipping window, transit time, and store processing time.

Accordingly, once a particular valid shipping endpoint is selected between two endpoints, an overall lead time can be calculated based on the known vendor order preparation time, transit time, and handling time at distribution centers/stores. By accessing each of these times at this increased level of granularity (both with respect to the components of total lead time and with respect to the specific shipping method selected), inventory planners may have greater control over lead times and therefore greater control over timing of restock of various inventory items. Accordingly, a retailer may more closely control its overall inventory, and have fewer stockout events and less unnecessarily stocked inventory.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A system for managing lead times in a supply chain, the system comprising:
   a transit time tracking system comprising:
      a processing device; and
      a memory device communicatively coupled to the processing device and storing:
         a graph database including a plurality of location nodes representing ZIP codes and a plurality of edges between pairs of the location nodes representing transit times between the ZIP codes; and
         instructions which, when executed by the processing device, cause the processing device to:
            receive, at a data fetcher, a request for a transit time, the request including an origin and a destination;
            query, with the data fetcher, the graph database for an origin ZIP code and a destination ZIP code;
            retrieve at least one transit time for the origin ZIP code node and destination ZIP code node, the at least one transit time being associated with a shipping mode; and
            output the at least one transit time and shipping mode for the origin ZIP code and destination ZIP code.

2. The system of claim 1, further comprising a lead time generation system in communication with an application programming interface (API) of the transit time tracking system, the lead time generation system comprising:
   a processing device; and
   a memory device communicatively coupled to the processing device and storing instructions which, when executed by the processing device, cause the processing device to:
      access processing times for the origin;
      access processing times for the destination;
      retrieve the at least one transit time and shipping mode for the origin ZIP code and destination ZIP code from the transit time tracking system; and
      calculate a lead time for a shipment between the origin and the destination using the shipping mode.

3. The transit time tracking system of claim 1, wherein the memory device further stores instructions that, when executed by the processing device, cause the processing device to:
   receive, at a data updater, one or more transit times for each of a plurality of pairs of origin ZIP codes and destination ZIP codes; and
   record each of the transit times as edges between corresponding origin ZIP code nodes and destination ZIP code nodes in the graph database.

4. The transit time tracking system of claim 1, wherein the graph database further includes nodes representing facility locations within a supply chain, each of the facility locations being associated with a ZIP code node based on a ZIP code of the facility location.

5. The transit time tracking system of claim 4, wherein the supply chain is a retail supply chain and the facility locations are one or more of distribution centers, vendors, and stores.

6. The transit time tracking system of claim 1, wherein the request is received through a graphical user interface (GUI) and the transit time is output through the GUI.

7. The transit time tracking system of claim 1, wherein the request is received through an application programming interface (API) and the transit time is output through the API.

8. The transit time tracking system of claim 1, wherein the estimated transit times are provided in hours for each of a plurality of a shipping modes.

9. The transit time tracking system of claim 1, wherein the query specifies a shipping mode and the output is one transit time for that shipping mode.

10. The transit time tracking system of claim 1, wherein the query does not specify a shipping mode and the output is one or more transit times for each available shipping mode for the origin and destination.

11. A method of managing lead times of a shipment between an origin and destination within a supply chain, the method comprising:

receiving, at a computing system, a request for a transit time, the request including an origin and a destination of a shipment;

querying a graph database for an origin ZIP code and a destination ZIP code, the graph database comprising nodes representing ZIP codes connected by edges representing transit times between the ZIP codes;

retrieving at least one transit time and shipping mode for the origin ZIP code and destination ZIP code; and outputting the at least one transit time and shipping mode.

12. The method of claim 11, wherein the origin is a first ZIP code and the destination is a second ZIP code.

13. The method of claim 11, wherein the origin is a first facility location and the destination is a second facility location.

14. The method of claim 11, wherein the graph database further comprises nodes representing facility locations that are connected to nodes representing ZIP codes by edges representing that the facility locations have the connected ZIP code.

15. The method of claim 11, wherein the request is received through a graphical user interface (GUI) and the estimated transit time is output through the GUI.

16. The method of claim 11, wherein the request is received through an application programming interface (API) and the estimated transit time is output through the API.

17. The method of claim 16, wherein the API is in communication with a lead time estimation system configured to:

access processing times for the origin;
access processing times for the destination;
retrieve the at least one transit time and shipping mode for the origin ZIP code and destination ZIP code from the transit time tracking system; and
calculate a lead time for a shipment between the origin and the destination using the shipping mode.

18. A computer implemented method of managing transit time information for a supply chain, the method comprising:

presenting a user interface on a display of a computing device, the user interface comprising:
a menu bar configured to display options for a plurality of a functions that can be implemented using the user interface, the options comprising:
an origin to destination search option;
a ZIP code search option;
a transit time information upload option; and
a node relationship search option; and
an information display area configured to display options for querying a transit time database and tables of search results obtained from the transit time database, the transit time database comprising a graph database storing estimated transit times as edges between origin nodes and destination nodes.

19. The computer implemented method of claim 18, further comprising:

receiving input selecting the origin to destination search option;
presenting, on the information display area, an origin field and a destination field;
receiving input of at least one of an origin at the origin field and a destination at the destination field;
querying the database using the input; and
presenting transit time information on the information display area of the user interface.

* * * * *